(12) United States Patent
Himmelmann

(10) Patent No.: US 10,578,095 B2
(45) Date of Patent: Mar. 3, 2020

(54) PERISTALTIC MOTOR AND PUMP COMBINATION

(71) Applicant: HAMILTON SUNDSTRAND CORPORATION, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 452 days.

(21) Appl. No.: 15/256,940

(22) Filed: Sep. 6, 2016

(65) Prior Publication Data

US 2018/0066647 A1 Mar. 8, 2018

(51) Int. Cl.
| | | |
|---|---|---|
| *B64G 1/60* | (2006.01) | |
| *C02F 1/66* | (2006.01) | |
| *C02F 1/68* | (2006.01) | |
| *F04B 15/04* | (2006.01) | |
| *F04B 43/12* | (2006.01) | |
| *C02F 103/00* | (2006.01) | |

(52) U.S. Cl.
CPC ............ *F04B 43/1253* (2013.01); *B64G 1/60* (2013.01); *C02F 1/66* (2013.01); *C02F 1/686* (2013.01); *F04B 15/04* (2013.01); *F04B 43/12* (2013.01); *C02F 2103/005* (2013.01); *C02F 2201/001* (2013.01); *F04B 2205/01* (2013.01)

(58) Field of Classification Search
CPC ...... C02F 1/00; C02F 1/50; C02F 1/68; C02F 1/685; C02F 1/66; C02F 1/686; C02F 2103/005; C02F 2201/001; C02F 2201/002; B64G 1/60; F04B 15/04; F04B 43/12; F04B 43/1253; F04B 43/1292; F04B 2205/01

See application file for complete search history.

(56) References Cited

U.S. PATENT DOCUMENTS

| | | |
|---|---|---|
| 3,053,842 A | 9/1962 | Meissner |
| 3,140,666 A | 7/1964 | Currie |
| 3,306,229 A | 2/1967 | Smythe |
| 3,431,864 A * | 3/1969 | Jones, Jr. ............ F04B 43/1253 417/475 |
| 3,662,888 A | 5/1972 | Kemper |
| 3,831,617 A | 8/1974 | Livingston |

(Continued)

FOREIGN PATENT DOCUMENTS

| | | |
|---|---|---|
| FR | 2607194 A1 | 5/1988 |
| GB | 2502584 A | 12/2013 |

(Continued)

OTHER PUBLICATIONS

European Search Report for European Application No. 17189711.9 dated Feb. 1, 2018.

*Primary Examiner* — Lucas A Stelling
(74) *Attorney, Agent, or Firm* — Carolson, Gaskey & Olds, P.C.

(57) ABSTRACT

A peristaltic pump system has a pump tube and a pump rotor engaging the pump tube. The pump rotor is drivable to rotate to move a pump fluid through the pump tube from a pump inlet to a pump outlet. A motor drives the pump rotor to rotate. The motor includes a motor tube and a motor rotor to be driven to rotate by a motor fluid moving through the motor tube from a motor inlet to a motor outlet. A urine treatment system and method are also disclosed.

3 Claims, 3 Drawing Sheets

(56) References Cited

U.S. PATENT DOCUMENTS

| | | | |
|---|---|---|---|
| 4,012,176 A | * | 3/1977 | Drori .................. F04B 43/1292 |
| | | | 137/101.31 |
| 4,118,315 A | * | 10/1978 | Fletcher .................. C02F 3/006 |
| | | | 210/638 |
| 4,997,347 A | | 3/1991 | Roos |
| 5,243,897 A | | 9/1993 | Walton et al. |
| 5,269,443 A | | 12/1993 | Lancaster |
| 5,513,963 A | | 5/1996 | Walton |
| 6,224,347 B1 | | 5/2001 | Clark et al. |
| 6,993,795 B2 | | 2/2006 | Prineppi |
| 7,544,050 B1 | | 6/2009 | Hunt et al. |
| 2010/0205732 A1 | | 8/2010 | Muhlhausen et al. |
| 2015/0104330 A1 | | 4/2015 | Chin et al. |
| 2016/0251242 A1 | | 9/2016 | Braden |

FOREIGN PATENT DOCUMENTS

| | | |
|---|---|---|
| WO | 1994/04257 | 3/1994 |
| WO | 2008083323 A1 | 7/2008 |
| WO | 2012046162 A1 | 4/2012 |
| WO | 2014058825 A1 | 4/2014 |

\* cited by examiner

PERISTALTIC MOTOR AND PUMP COMBINATION

BACKGROUND OF THE INVENTION

This application relates to a peristaltic pump that is driven by a peristaltic motor.

Many types of pumps have been developed for different applications. One type pump, which may be utilized to move a harsh fluid, is a peristaltic pump. In a common peristaltic pump, a rotor carries a plurality of rollers, which are moved along a tube. A fluid to be moved is received in the tube. The rollers pinch the tube and as they rotate along the tube, they move the fluid from an inlet to an outlet.

It has also been proposed to utilize a peristaltic system such as described above, but in a reverse operation as a motor. However, a peristaltic motor has never been proposed to drive a peristaltic pump.

Again, many systems utilize pumps. One such system is a urine treatment system for use on a spacecraft. In such a system, the water in the urine must be purified for reuse. It is known to deliver urine into a container. The urine is mixed with a quantity of water and an acid. This is part of the treatment for separating the water from the urine such that it can be reused.

Systems for moving the water and metering the acid are somewhat complicated.

SUMMARY OF THE INVENTION

A peristaltic pump system has a pump tube and a rotor engaging the pump tube. The rotor is drivable to rotate to move a fluid through the pump tube from a pump inlet to a pump outlet. A motor drives the pump rotor to rotate. The motor includes a motor tube and a motor rotor to be driven to rotate by a fluid moving through the motor tube.

A urine treatment system and method are also disclosed.

These and other features may be best understood from the following drawings and specification.

DETAILED DESCRIPTION

Figure 1:
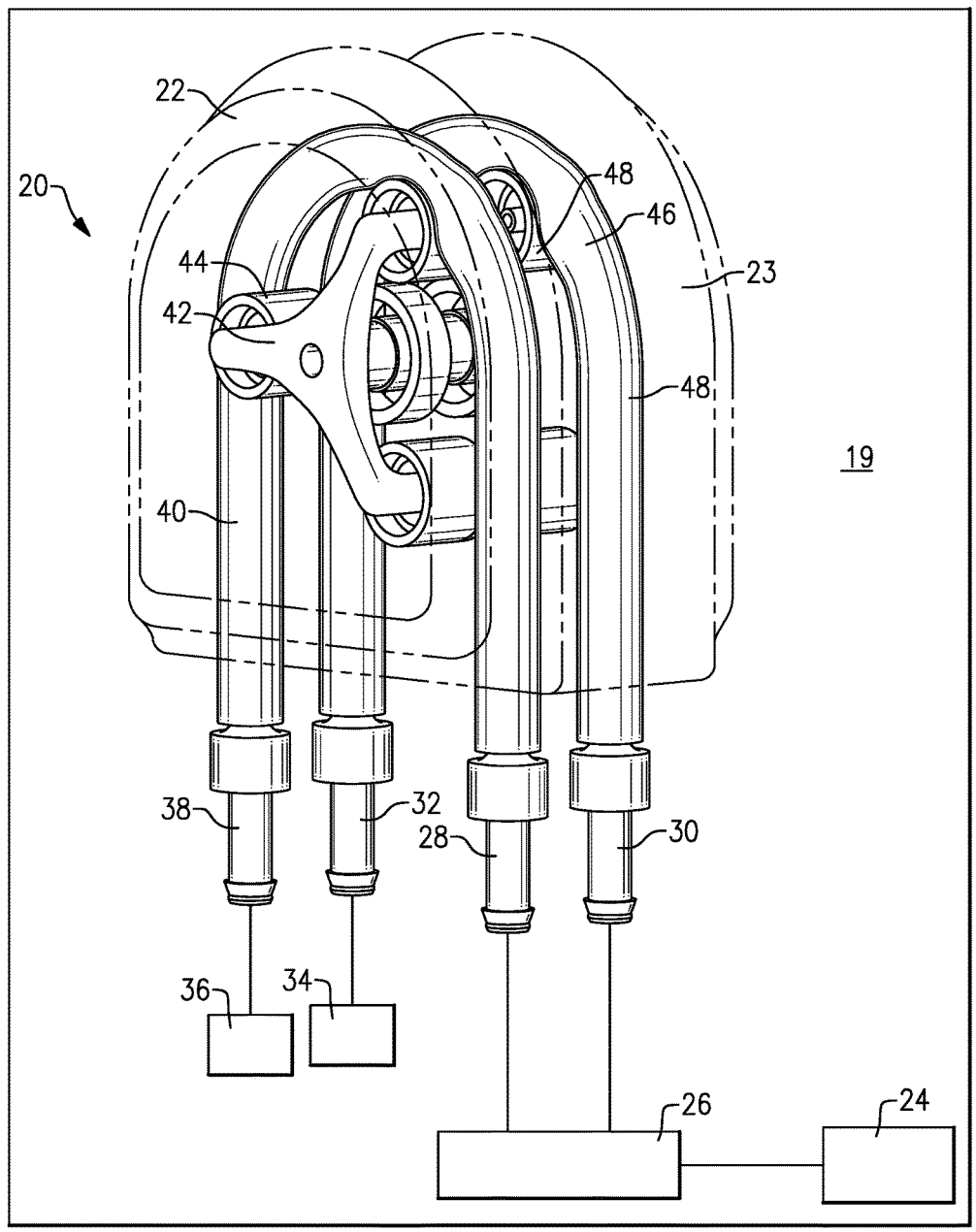
FIG. 1 shows a water treatment system.

A water treatment system 20, such as may be utilized on a spacecraft 19, includes a combined peristaltic motor and pump 22. A surrounding housing 23 is shown in phantom. A toilet 24 is shown schematically and will deliver urine into a container 26. A water outlet 28 delivers a quantity of water into the container 26. An acid outlet 30 also delivers an acid into the container 26. It may be that the acid from outlet 30 and water from outlet 28 mix before reaching the container 26. The use of the combined water and acid to treat the urine and removed water from the urine is generally as known.

An acid inlet 32 receives an acid from a source 34. A water supply 36 delivers pressurized water into a motor inlet 38.

In a spacecraft application, a main source of drive would be pressurized water. As such, the combined peristaltic pump and motor 22 provide valuable benefits in that the pressurized water is utilized as a driving force for the acid pump as will be explained below.

Since the water source 36 is the potable water for the spacecraft, it is important to keep the acid and water separate until being mixed. The combined peristaltic pump and motor 22 achieve this goal.

A motor tube 40 is shown along with a rotor 42. Rotor 42 rotates and moves rollers 44 along a length of the tube 40. Another tube 46 is a pump tube. Rollers 48 from a pump rotor (not shown in this figure) move along the tube 46.

Figure 2:
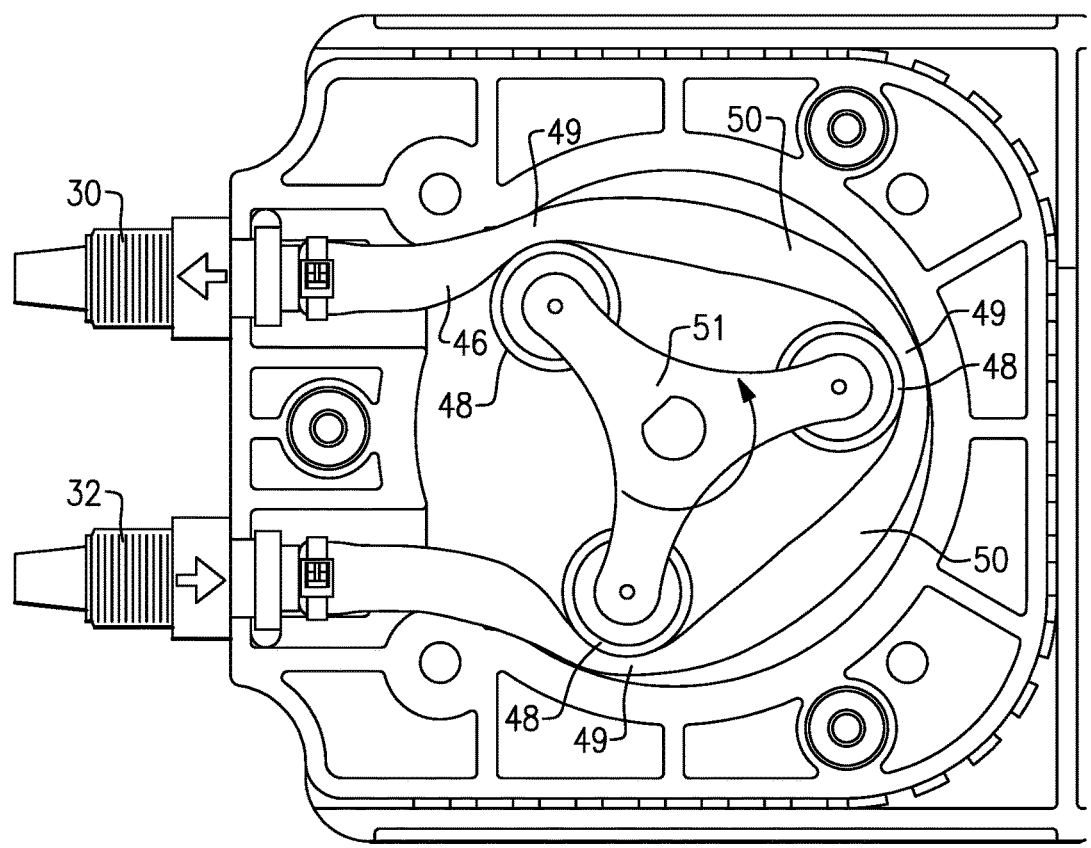
FIG. 2 shows a feature of a peristaltic pump.

FIG. 2 shows the operation of the peristaltic pump for moving the acid. As shown, the rotor 51 is driven to rotate the rollers 48. The rollers pinch the tube as shown at 49. Intermediate the tube pinch points 49 is a pumping chamber 50. Fluid to be moved is trapped in the chamber 50 between the two pinch points 49. As the rotor 51 continues to rotate, the fluid is moved from the inlet 32 toward the outlet 30. As can be appreciated, the fluid in the pump is acid and will be maintained separate from the fluid in the motor, potable water, since each fluid is received in its respective tubes.

The motor side works in the opposed direction. That is, pressurized water is directed into the inlet 38 and will drive the motor rotor 42 by causing the pinch points between the rollers 44 to drive the rollers and hence the rotor to rotate. Thus, as the pressurized water moves from its inlet 38 to its outlet 28, it causes the rotor 42 to rotate. This, in turn, causes the pump rotor 51 to rotate.

Since the water driving the motor is being delivered into a container along with the rotor 51 driving the acid, this facilitates the metering of the two fluids. Details of a method for ensuring proper relative amounts of water and acid are disclosed in co-pending application, Ser. No. 15/256,790, filed on even date herewith, and entitled "Metering for Fluid Motor and Pump Combination," owned by the assignee of this application, and developed by the inventor of this application. Details relative to metering are incorporated herein by reference.

Figure 3:
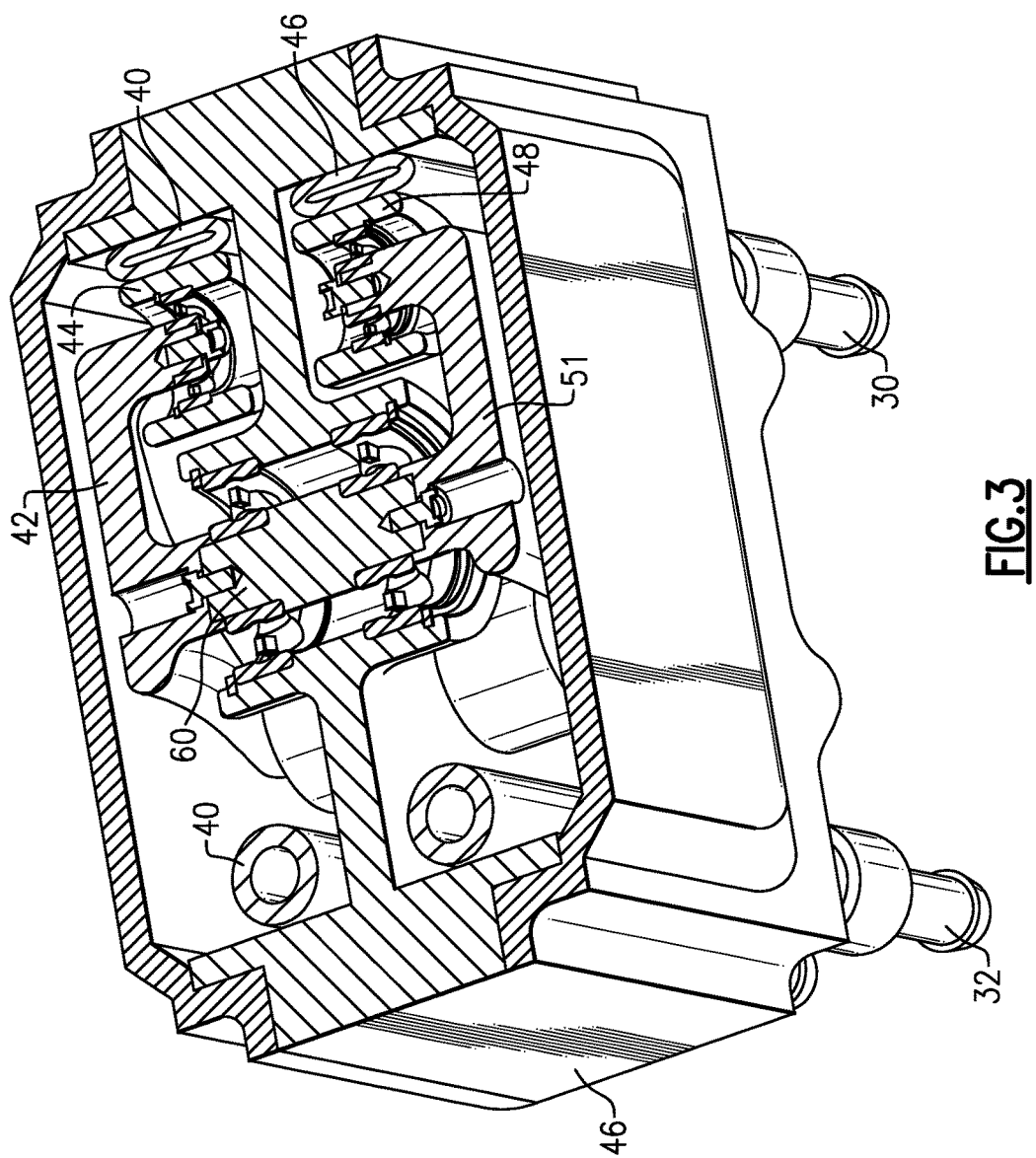
FIG. 3 shows details of the combined peristaltic pump and motor.

FIG. 3 shows further details. A connecting shaft 60 connects rotors 42 and 51. The tubes 40 and 46 are shown as well as the rollers 44 and 48. As is clear, the shaft 60 spaces the rotors 42 and 51 such that they are axially spaced along an axis of rotation of the shaft 60. As also clear, rotor 42 and 51 are fixed to opposed ends of shaft 40.

Thus, a combined peristaltic pump and motor is provided to drive a fluid from an inlet to an outlet.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A urine treatment system comprising:
a container to receive urine from a toilet, and a pump for delivering an acid into said container and a motor for delivering water into said container;
said pump including a pump tube and a pump rotor engaging said pump tube, said pump rotor being drivable to rotate to move the acid through said pump tube from a pump inlet to a pump outlet;
said motor for driving said pump rotor to rotate, said motor including a motor tube and a motor rotor to be driven to rotate by pressurized water moving through said motor tube from a motor inlet to a motor outlet;
wherein said pump rotor and said motor rotor are in contact with said pump tube and said motor tube, respectively, and there are pinch points on said motor tube caused by said motor rotor, and the pressurized water delivered into said motor tube moves said pinch points on said motor tube to cause said motor rotor to rotate and rotate said pump rotor, and said pump rotor forming pinch points on said pump tube, and said pinch points moving as said pump rotor rotates to move the acid to the pump outlet; and a shaft connecting said pump rotor to said motor rotor, such that said pump rotor and said motor rotor are axially spaced along an axis of rotation of said shaft, and said pump rotor being fixed to one end of said shaft and said motor rotor being fixed to an opposed end of said shaft.

2. The urine treatment system as set forth in claim 1, wherein said pump rotor and said motor rotor each carrying a plurality of rollers, which form said pinch points on said motor tube and said pump tube.

3. The urine treatment system as set forth in claim 1, wherein said system is on a spacecraft.

\* \* \* \* \*